Dec. 11, 1951 LE ROY H. KIESLING 2,578,431
VERTICAL LIFT CONTROL SYSTEM
Filed Aug. 30, 1950 7 Sheets-Sheet 1

INVENTOR
LE ROY H. KIESLING
BY
Thomas M. Ferrill, Jr.
ATTORNEY

Dec. 11, 1951    LE ROY H. KIESLING    2,578,431
VERTICAL LIFT CONTROL SYSTEM

Filed Aug. 30, 1950    7 Sheets-Sheet 4

INVENTOR
LeROY H. KIESLING
BY
Thomas M. Ferrill, Jr.
ATTORNEY

Dec. 11, 1951 LE ROY H. KIESLING 2,578,431
VERTICAL LIFT CONTROL SYSTEM
Filed Aug. 30, 1950 7 Sheets-Sheet 5

INVENTOR
LeRoy H. Kiesling
BY
Thomas M. Ferrill, Jr.
ATTORNEY

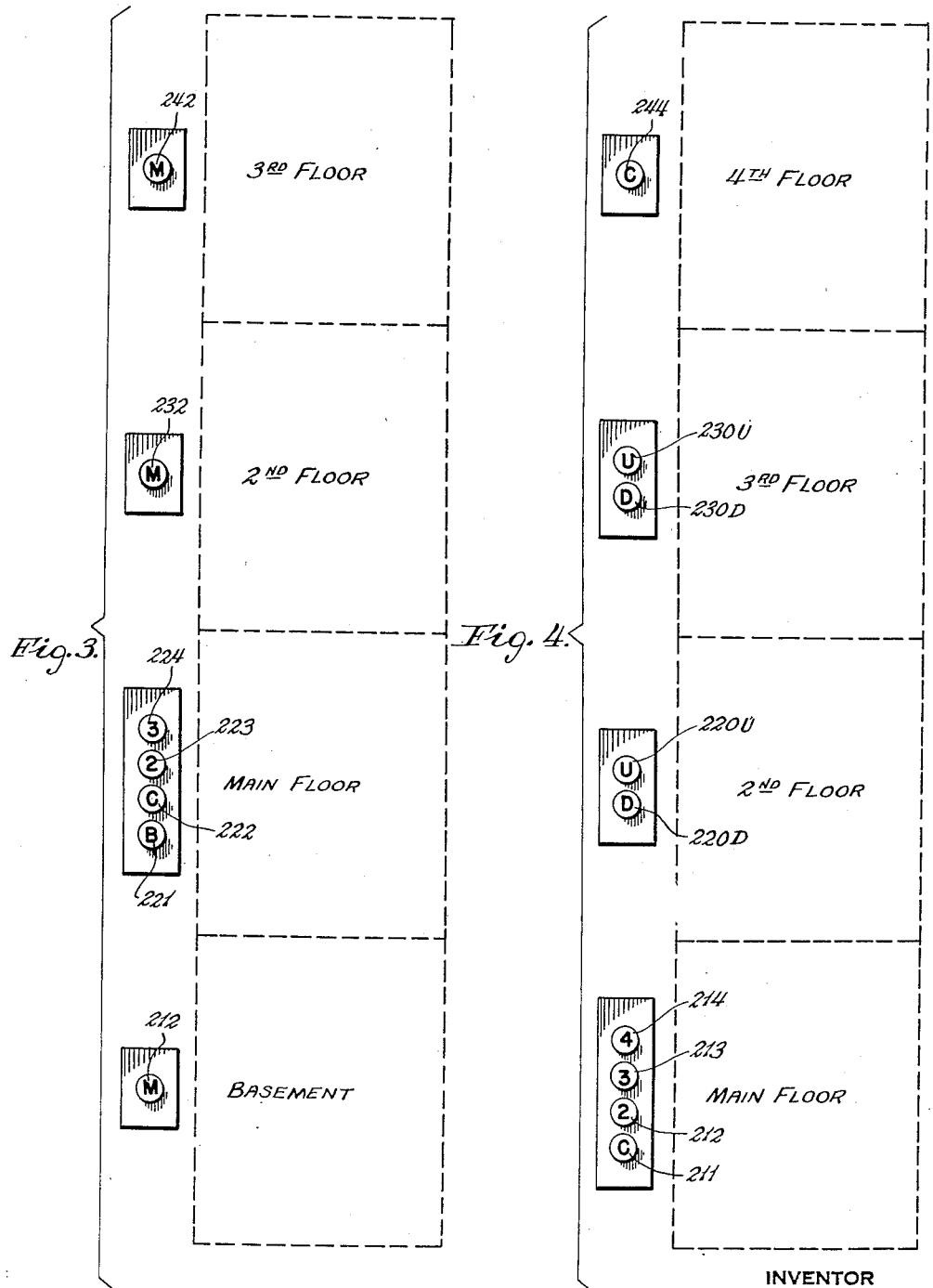

Patented Dec. 11, 1951

2,578,431

UNITED STATES PATENT OFFICE 2,578,431

VERTICAL LIFT CONTROL SYSTEM

Le Roy H. Kiesling, Bay Shore, N. Y.

Application August 30, 1950, Serial No. 182,379

29 Claims. (Cl. 187—29)

The present invention relates to automatic control systems for elevators, and is particularly concerned with elevators so designed as to obviate the services of an elevator operator, or to be used under the control of an operator as in freight elevator service. The invention thus comprehends elevator systems of universal application.

The present application is a continuation-in-part of my application Serial No. 137,709, filed January 10, 1950, now abandoned.

Self-service elevators have heretofore been used for apartment buildings and professional office buildings and similar services, particularly where the calls for the elevator do not conform to a program of constant demands.

Such self-service elevators have in the past been provided with one or two "call" button switches at each floor, arranged to enable a prospective passenger to establish a circuit to compel the elevator car to come to his floor. Upon the arrival of the elevator car, the call is satisfied, and the calling passenger enters the elevator and then selects one of a series of numbered buttons representing the desired destination floor number, and depresses that button. The car then proceeds to the corresponding floor, and the passenger disembarks.

Where two call buttons were provided at each floor, they were marked "up" and "down," respectively, in order to have the prospective passenger signal the desired direction of travel. In systems so arranged, a passenger wishing to descend would depress a "down call" button in the hallway, and any passenger wishing to ascend would depress an "up call" button. The destination floor has to be signalled within the car, after arrival of the car and entry by the passenger.

In such prior systems as described above, the order of response to a plurality of unsatisfied calls was set up for maintenance of progress in one direction until no further movement in that direction was required, and for momentary interruption of the progress in that direction only if a "call" signal or a car signal directed the car to stop at a station in travel in that direction.

No variation of the priority of the car responses could be had in such a system. Even though the car were completely filled by a party of passengers at an upper floor of a large apartment house, all destined for the first floor, the car would nevertheless stop during its downward travel at every one of the floors en route at which there were signalled "down calls" in advance of the decent of the car thereto. Such stops were futile, taxing the patience of the passengers aboard as well as the prospective passengers waiting at the various intermediate floors. These stops, with the explanations to those waiting, greatly delayed the trip of those aboard, and also lengthened the time until the elevator could return to the highest "down" call and retrace its series of stops to admit the prospective passengers. Unless each of these persons waiting at the various intermediate floors had been aware of the necessity of resignalling his call, moreover, he would not even be given an opportunity to enter the car on its next passage in his intended direction of travel, and would have to signal a further call eventually to have the car made available for his trip.

Where the elevators of the prior art were used to convey freight or furniture from one floor to another, no satisfactory arrangement was available for by-passing intermediate calls for trips in the direction of the progress of the car, and it responded with a stop for each such call even if fully loaded with a cargo. Attempts have been made to overcome this limitation of elevator systems, but at best, these attempts have been largely unsuccesseful due to requirement of constant exertion of a force on a momentary contact switch to by-pass a call.

The object of the present invention is to provide an automatic elevator system more realistically suited to the needs encountered in service, than those which hitherto have been used.

As one phase of this general objective, it is desirable that a prospective passenger be enabled to carry out a single signalling operation, both for summoning the car to his station and for directing it to his destination, the elevator system being so arranged that following this one signalling operation, the elevator comes to the passenger's station, waits there a predetermined time to permit his entry, and proceeds to his destination and waits there a predetermined time to permit his exit.

Also encompassed within this general objective is the provision of control arrangements permitting a person in the elevator car to cause it to by-pass calls standing at intermediate floors or stations, in the event that the car is fully loaded so that stops at such stations would be futile, or in the event that an emergency situation demands the maximum swiftness to the destination, and also, to provide for an emergency call of the car.

It is an important object of this invention to provide all of the foregoing features and withal to achieve such a control system that each and every signal will be retained intact and satisfied in the proper order taking into account the directions of the destinations, regardless of the conditions of the system at the times the various calls were signalled, the departures from the normal direction-order of responses being limited to such departures as are specially occasioned by emergency call signals.

In my prior Patent No. 2,507,791, issued May 16, 1950 on application Serial No. 119,903, filed October 6, 1949, a continuation-in-part of my prior patent application Serial No. 31,672, filed June 8, 1948, now abandoned, I have shown and described a control system suitable for a self-service elevator, and arranged in such a way as to permit a person at one station to actuate one of a set of hallway control buttons for the desired destination of the car, provided that the car is present at his station at the time of such button actuation. The car would thereupon respond by proceeding to the destination as signalled. This system of Patent No. 2,507,791 required two signalling operations when a person at one station wished to call the car to his station and then have it proceed to a designated floor. It was necessary for the prospective passenger to depress a first button—the call signal—to summon the car to his station, and only after its arrival at his station could he effect the further directive signal by depressing the further button directing the car to his destination.

The present invention achieves the above specified objects, including the manually operable by-pass holding feature along with the single signal call-send feature whereby a person at one station may depress a button numbered according to his desired destination, and rest assured that the car will in due course come to him and stop, permitting him to enter, and then without requirement of any further action on his part, will proceed to his destination and stop there to permit him to step out. Moreover, if the floor he signals as his destination is above him, and the car is above him at the time of his signal actuation, prior response will be given to all signals requiring the car to proceed to stations below him before the car stops at his station in response to his signal to permit him to enter and be lifted to his destination.

The above general description and objects of the present invention will be clarified and amplified in the following detailed description of specific embodiments of the present invention, set forth in reference to the appended drawings, wherein:

Fig. 1 is divided into five parts designated Fig. 1-A, Fig. 1-B, Fig. 1-C, Fig. 1-D and Fig. 1-E with letters at the borders of the respective sheets indicating the continuations of conductors therebetween;

Figs. 3 and 4 are drawings of two illustrative arrangements of hall control buttons showing two of the many ways the present system can be modified according to the needs of a particular building installation.

Figure 1A:
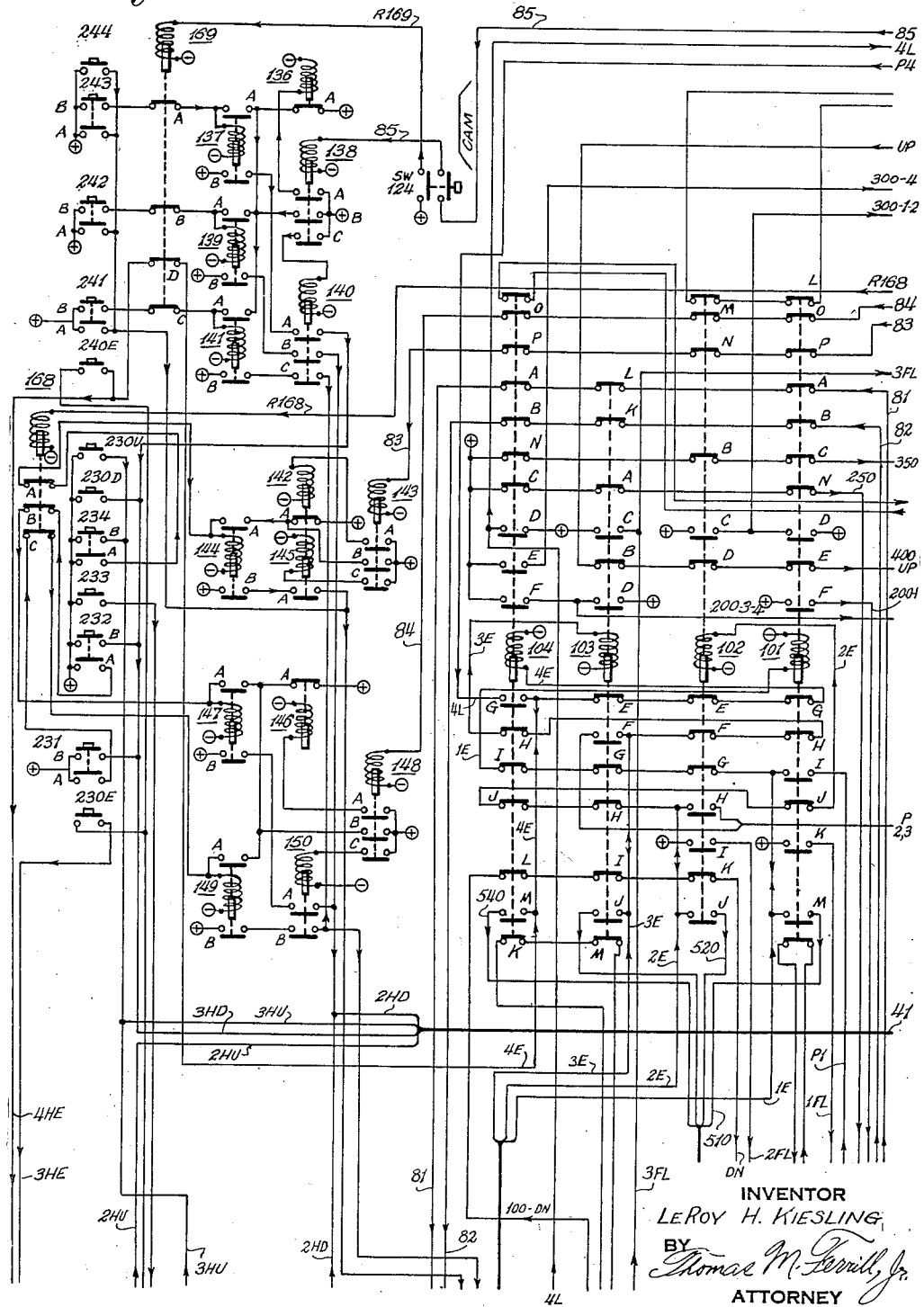
Fig. 1 is a circuit diagram of an embodiment of my present invention, it being illustrated as a system for four stations, thus showing two typical intermediate floor control provisions.
Figure 1B:
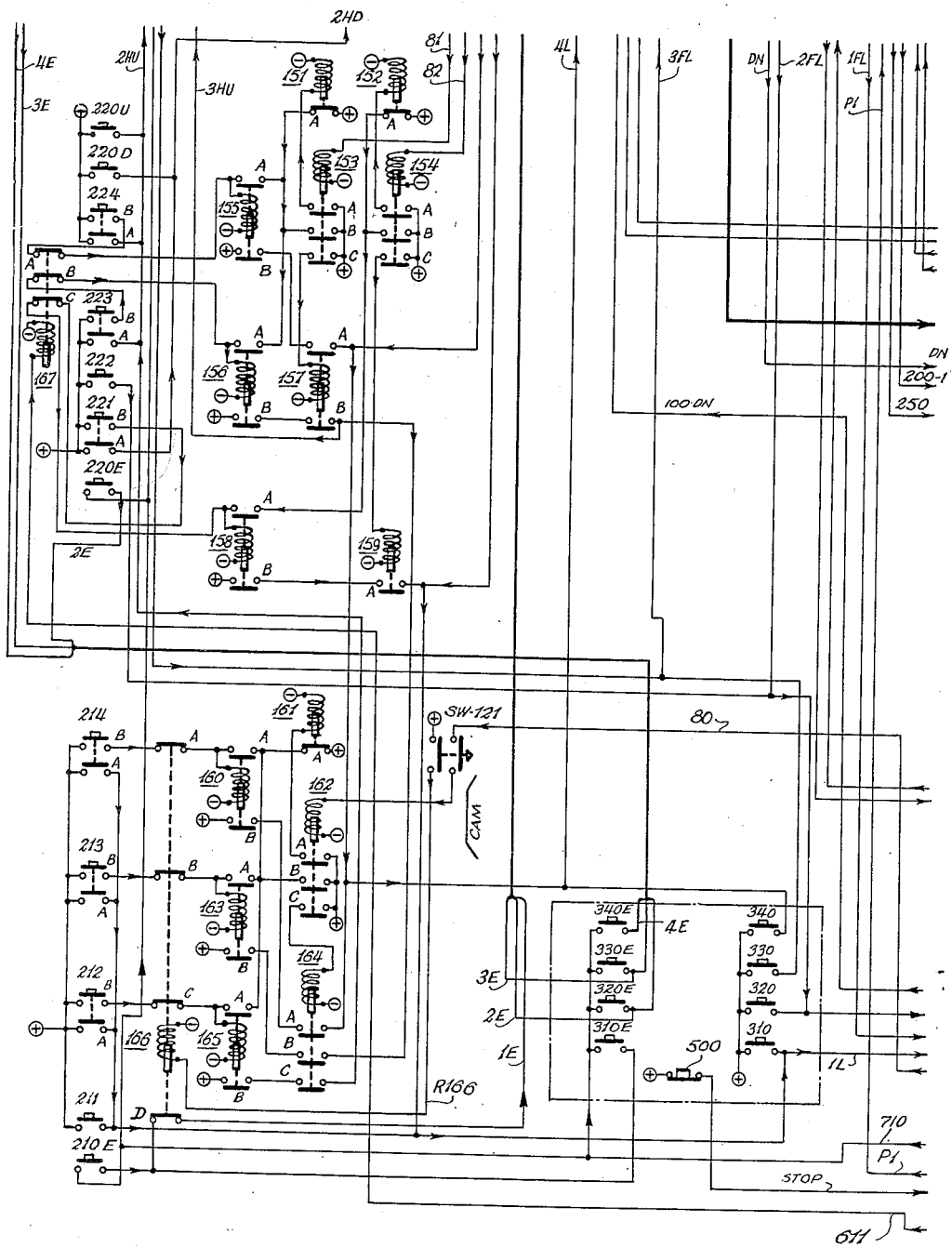
Figure 1C:
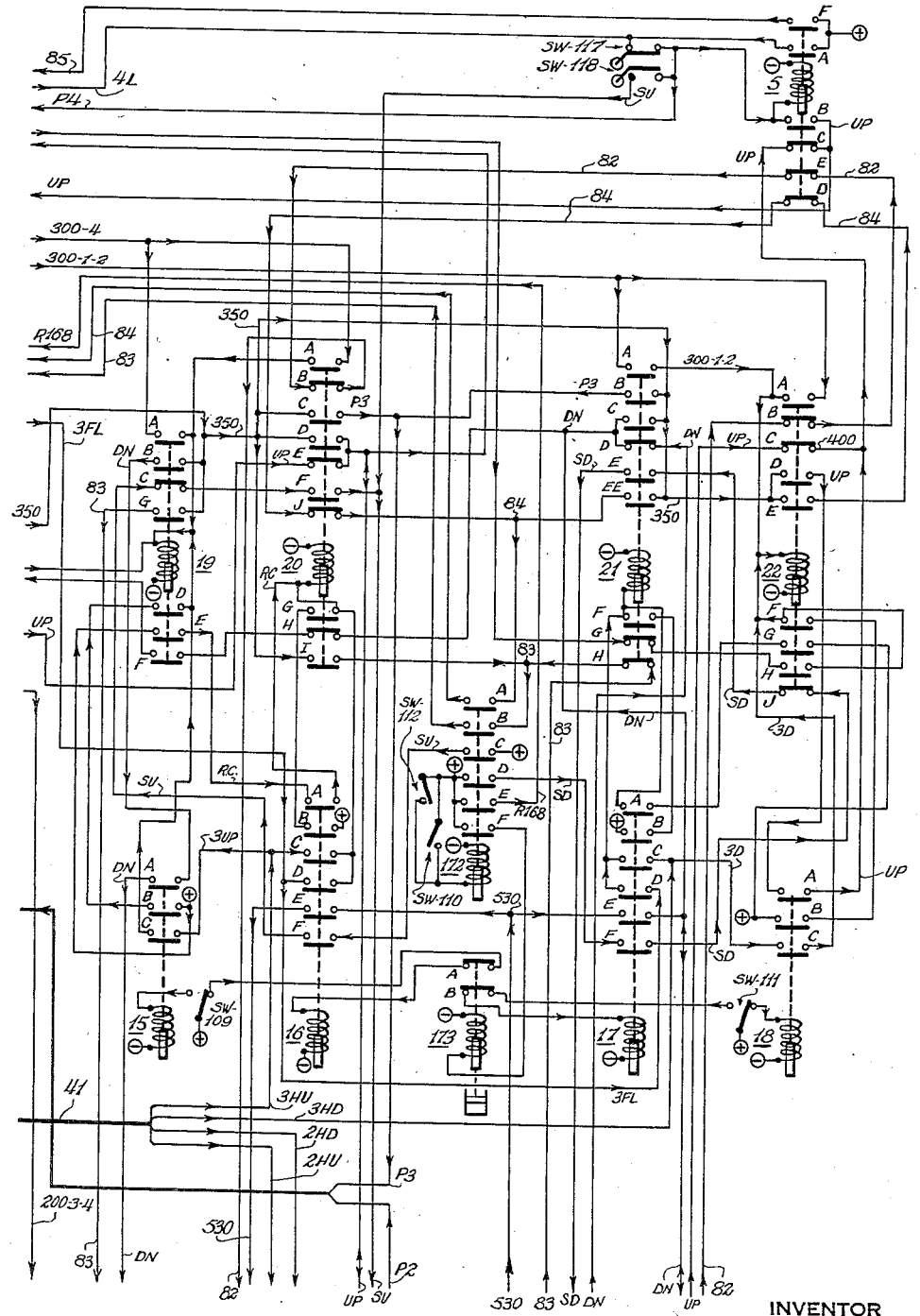
Figure 1D:
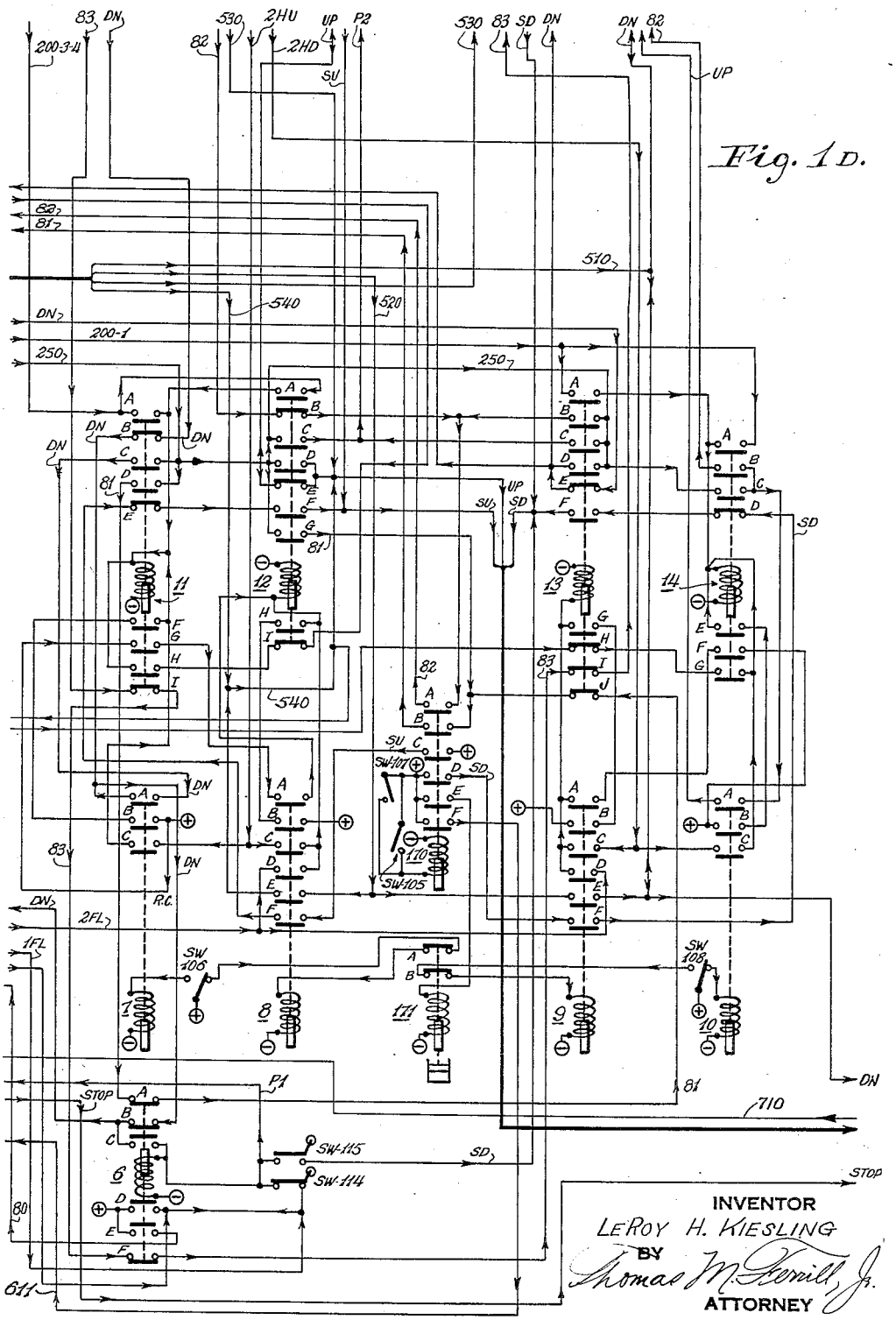
Figure 1E:
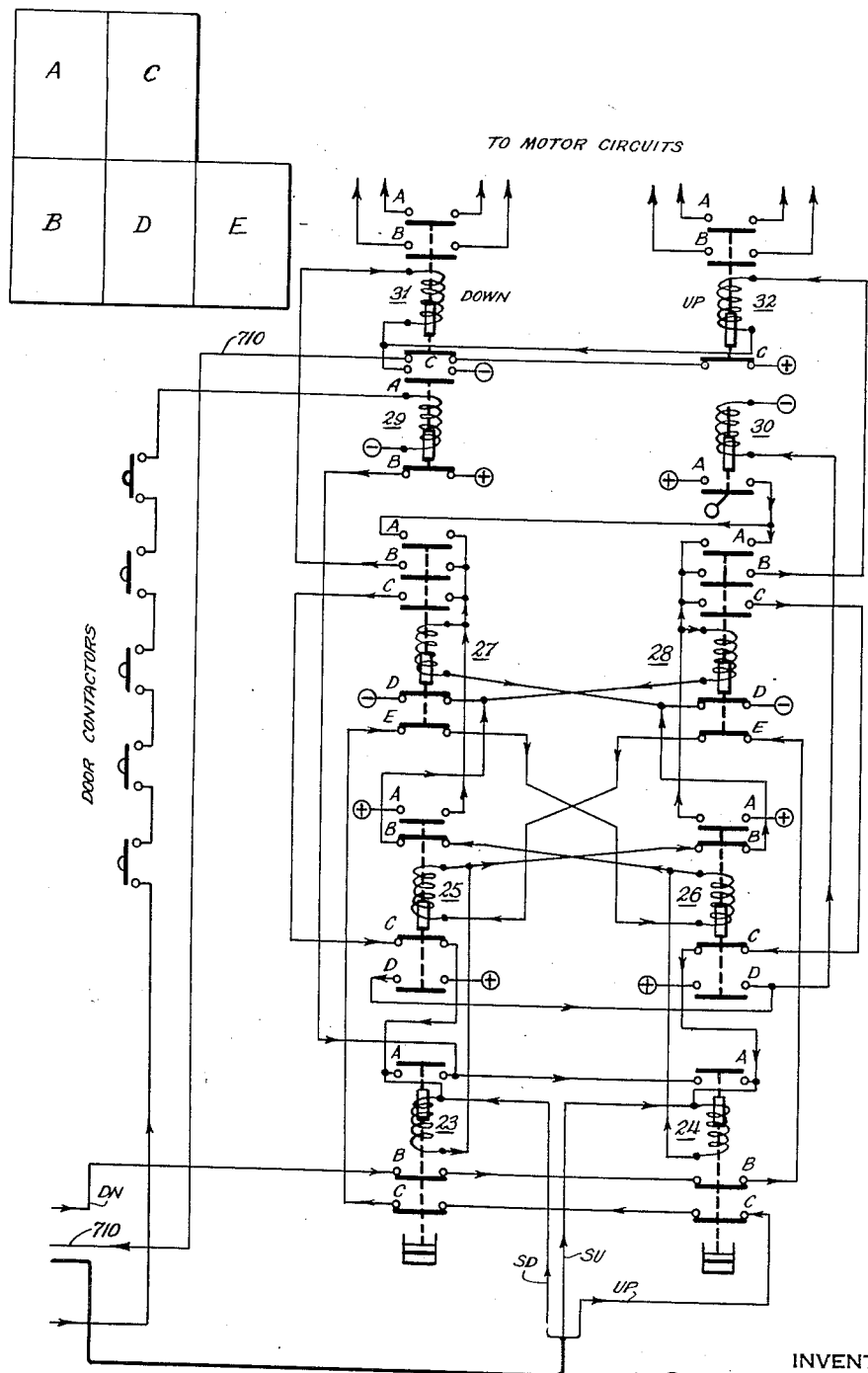

Referring now to Figs. 1-A, 1-B, 1-C, 1-D, 1-E and 2, there are shown a set of four banks of manually operable switches such as push-button switches, one bank being indicated for each of the four stations served by the elevator system.

Each station is shown as provided with an emergency call switch, a set of three call-send switches for calling the car to the station and automatically directing it to a desired destination, and at least one switch for merely calling the car. At station I, switch 210E is the emergency call switch, and switch 211 is arranged to bring the car to station I without special priority. Switches 212, 213 and 214 are station or hall switches, for calling the car to station I and for causing it to proceed to station II, station III, or station IV, respectively.

Similarly, at station II, switch 220E, is an express call switch. Switches 220U, 220D, and 222 are all switches for calling the car, merely, without priority control effect. Switch 222 will stop the car at station II irrespective of direction of travel thereto, but switch 220D will not stop the car in its upward passage thereby, as it travels upward to answer a higher station call, and similarly, switch 220U will not stop the car in its downward passage by station II as it travels downward to answer a lower station call. Switches 221, 223 and 224 are call-send switches, the last digit of these respective numeral designations corresponding to the floor to which the car is sent upon its arrival at station II.

The switches at stations III and IV are numbered according to the same pattern as those at stations II and I, respectively.

Additional banks of signalling switches are provided in the car, including a stop switch 500, and a local switch and an express or emergency switch for each station, to permit a person in the car to signal for a desired destination if his initial signal was not instituted by way of one of the call-send switches. These switches in the car are arranged similarly to the corresponding switches shown in my aforementioned copending application Serial No. 31,672, filed June 8, 1948, and application Serial No. 119,903, filed October 6, 1949, now Patent No. 2,507,791.

Special features of the present invention are involved in the provision of the call-send switches and the accompanying circuits operating automatically in conjunction therewith to bring the car to the station and send it thence in the proper timing, along with the emergency-express feature and the ordered responses with direction taken into account.

It will be readily apparent from the ensuing description of the system that a different group of switches may be provided at one or more stations than those shown. A practical system of four or more stations may be provided with call-send switches at the principal station, e. g. station II, this usually being the station corresponding to the lobby floor of a building, station I corresponding to the basement and stations III and IV being representative of a plurality of upper floors. In such a system, the call-send switches and accompanying circuit features are particularly important at the lobby floor, where it most frequently occurs that several prospective passengers await the car and require it to take them to different upper-level destinations.

Seventy relays are employed in the system of Figs. 1-A, to 1-E. Relays 101, 102, 103 and 104 are express relays having contactors through which ordinary call or send signal circuits are routed to the motor control relays. An express call for station I causes actuation of relay 101, which thereupon opens contactors to prevent response of the car to any other signal until it has proceeded directly to station I. As will become apparent, such operation of relay 101 does not prevent or interrupt holding circuits for other calls, but instead, it merely postpones response thereto. Relays 102, 103 and 104 similarly are for express calls to stations II, III, IV, respectively.

Relays 5 and 6 are terminal call holding relays for the upper terminal station and the bottom station, respectively.

Figure 2:
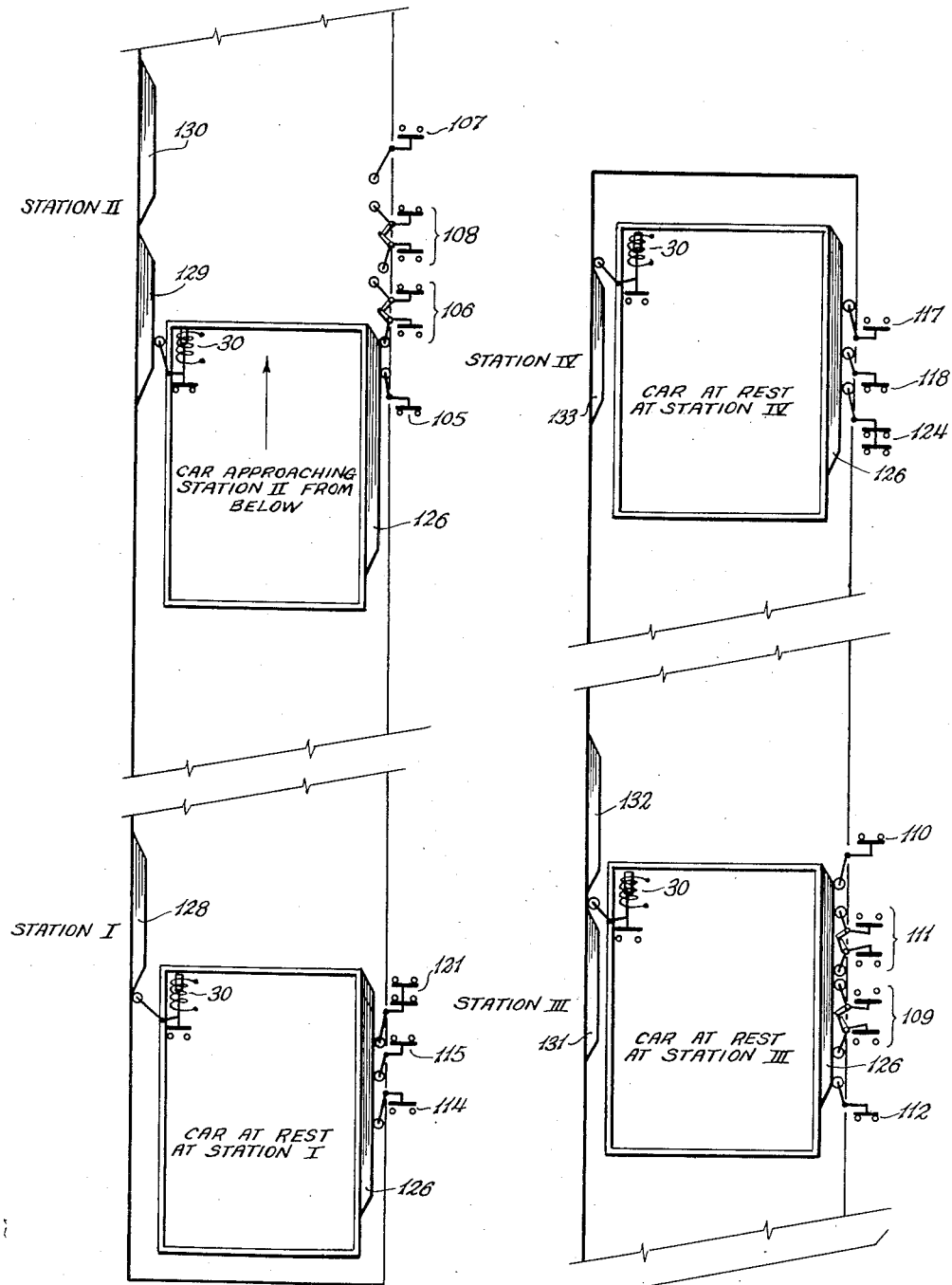
Fig. 2 is a hatchway diagram showing the general arrangement of cams and cam switches of the system of Fig. 1.

A bank of ten relays is provided for each intermediate station. Relays 7, 8, 9 and 10 are provided at station II, relays 7 and 8 being selectively operated by double-throw switch 106, and relays 9 and 10 being selectively operated by double-throw switch 108. These double-throw switches are arranged in the hatchway to be actuated by a cam 119 on the car, as illustrated in Fig. 2.

Relays 11, 12, 13 and 14 at station II are provided for holding and transfer of calls for bringing the car to this intermediate station, with due respect to direction in which the car must come to the station and the direction in which a prospective user is to be taken from the station.

Relay pairs 15, 16 and 17, 18 are provided at station III for control by cam-actuated double-throw switches 109 and 111, and relays 19, 20, 21 and 22 are provided for holding and transfer of calls to bring the car to station III, these being counterparts at this station of relays 11—14 at station II.

Relays 23 and 24 are time delay relays, for holding the car at each stop for a predetermined minimum time interval, sufficient to permit the car to be entered and put in use. These relays also serve a directional preference purpose under certain conditions, as will be described. Relays 25, 26, 27 and 28 are interconnected relays through which are controlled the motor power relays 31 and 32 for downward motor drive and upward motor drive, respectively.

Relay 29 is provided for normal actuation through series-connected door contactor switches at the several stations, and for interruption of the motor relay circuits when any station door is opened.

Relay 30 is a relay on the car with an actuator for engaging a hatchway cam, one cam being provided at each terminal station and two cams being provided at each intermediate station for this purpose.

A pair of relays 170 and 171 in tandem connection are provided at station II for operation through switches 105 and 107. A similar pair of tandem relays 172 and 173 are provided at station III for operation through switches 110 and 112.

A set of six relays are provided for each terminal station for the handling of the destination signalling brought about by call-send switch operations, and a set of nine relays are similarly provided for each intermediate station. These relays are designated numbers 136—141 for station IV, numbers 142—150 for station III, numbers 151—159 for station II, and 160—165 for station I.

Four additional relays 166—169 are provided for prevention of use of the call-send station switches for destination signalling by persons at a station at which the car already is located.

To commence the illustration of the operation of the system of Fig. 1 with a simple case, suppose a prospective passenger at station II momentarily depresses switch 220D and suppose the car is below station II and all hatchway doors are closed. Further assuming that there are no other demands signalled for the car, circuit conditions will be set up to cause the car to proceed to intermediate station II, as follows: Tracing circuit 2HD over the four-conductor cable 41, this conductor is observed to be connected to contactor 9C and contactor 10C. Contactor 9C is open, and contactor 10C is closed, because the arm of double-throw switch 108 contacts the terminal connected to the coil of relay 10 when the car is below, so that relay 10 is energized. Proceeding onward through contactor 10C, the circuit is traced to the coil of relay 14, which is accordingly energized. Through contactor 10B and contactor 14E, a holding circuit is now provided for maintaining relay 14 energized, so that a holding circuit condition is here developed in response to the momentary depression of hallway control switch 220—D.

A further circuit may now be traced from the positive supply through normally closed contactor 104C through conductor 250, through contactors 103A, 101N, 14C, 18A and normally closed contactor 22C, thence through contactors 5C, 103B, 102D, 101E, 20E, 12E, via conductor UP to contactors 24C, 23C and 27E to energize the coil of relay 26. Through the coil of relay 26, the energization circuit is traced onward through contactor 25B and contactor 27D to the negative supply line. Through this circuit, relay 26 is momentarily energized. A holding circuit is thereupon established from the positive supply terminal through contactor 26A, the coil of relay 28 and thence through contactor 27D to the negative supply terminal, so that relay 28 is energized.

Now, from the positive supply line, a further circuit is traced through contactor 26D to the coil of relay 30, the opposite end of which is connected to the negative supply line so that this relay is energized, closing contactor 30A. Thereupon, a circuit is established from the positive supply line through contactor 30A, thence through contactors 23A and 28B, to the coil of and up motor energization relay 32, whence the circuit continues through contactor 29A to the negative supply main so long as relay 29 is energized through all of the door contactor switches and the normally closed emergency stop switch 500.

As a result of relay 32 being energized and the up motor propulsion circuits therethrough (not shown), the car starts upward toward station II.

When the car comes within a relatively short predetermined distance of the landing at station II, the cam relay 30 situated on the car engages a cam 129 (see Fig. 2) suitably positioned in the hatchway at station II so that even though coil 30 thereafter becomes deenergized, contactor 30A cannot immediately open. The arrangement of the cam-actuator on the contactor element of relay 30 is such that the cams therefor, upon engagement, clamp this actuator in closed position independently of the magnetic attraction due to current through the coil of the relay. When the car has continued somewhat further, double-throw switch 108 (mounted in the hatchway) is transferred from the position shown to the neutral position, with no circuit completed therethrough. This deenergizes relay 10, interrupting circuit 250 at contactor 10A, and causing relay 14 to be deenergized by the opening of contactor 10B.

Now with relay 26 deenergized, contactor 26D is opened, breaking the circuit through coil 30 so that relay 30 is no longer energized. The circuit through contactors 30A and 28A continues to hold the coil of relay 28 energized, however, because of the continued engagement of cam 129 with the cam actuator of relay 30 while the car approaches its position of register with station II.

Now, through contactors 30A, 28A and 28C and reclosed contactor 26C, a circuit is provided through the coil of relay 24 which is traced onward through contactors 25B and 27D to the negative supply line. This circuit provides energization of time delay relay 24, holding its armature depressed to such an extent that appreciable time after deenergization of this relay will be required for the dashpot system attached thereto to permit the armature to return to its fully raised position.

A direction preference retention feature of the delay relays 23 and 24 may be described in this connection. Delay relay 24 is provided with a difference of spacing of its contactors 24B and 24C such that contactor 24C recloses very shortly before 24B. If, after the arrival of the car at station II but before the predetermined delay interval has elapsed a call is signalled for the car to proceed upward, and another call is in for the car to descend, the call for movement upward is given preference because of the prior reclosure of contactor 24C and the resultant prompt energization therethrough of relay 26 and the consequent prompt energization of relay 28. Relays 26 and 28, being energized, block the circuits for the down-direction relays 25 and 27 at contactors 26B and 28E and D. Hence, upon the reclosure of contactor 24C, the up call has the advantage of prior actuations of relays 26 and 28, and hence it must be satisfied prior to the other call which would have required down travel.

Thus, relays 26 and 28 for the up direction normally retain their monopoly on that direction of travel against the competitive directional tendency of down calls, and relay 24 supplements their action to retain preference for a prevailing up-direction of travel even through the time delay period.

For the down direction, the contactors of time delay relay 23 reclose in the opposite order, contactor 23B reclosing just before 23C, so that when the car has travelled down to an intermediate station and is being held there for the delay interval while the time delay element of relay 23 operates, a call for the car to proceed downward will be given preference over a call for the car to proceed upward by virtue of the prior reclosure and establishment of the actuation circuits to relays 25 and 27.

When the car arrives substantially at the landing of station II, the actuator of relay 30 passes off the end of the lower station II hatchway cam 129, thereby breaking the circuit from the positive supply line by the opening of contactor 30A, and in turn deenergizing relay 28 and relay 32, stopping the car.

This illustrates the circuit condition or set of conditions provided in response to a call of the car to station II for a trip downward, the car having been beneath station II and the system having been idle up to the time of institution of the call.

As is readily apparent, this set of circuit conditions is ended when the car has been brought to station II in response to this call, the car having been stopped at station II and being in readiness there for the descent for which it was called through switch 220D.

Suppose again that the car is beneath station II, and that switch 221 is actuated, to call the car and at the same time to provide for subsequent automatic descent thereof to station I. The lower section 221A of this switch, in shunt with switch 220D, provides for the entire set of circuit conditions as described above in consequence of the depression of switch 220D. The upper section 221B provides momentary energization of relay 158 through normally closed contactor 167C, so that contactors A and B of relay 158 are both closed momentarily. Through contactor 158A, a holding circuit is then provided to the coil of relay 158, this circuit being traced through normally closed contactor 152A.

Upon close approach of the car to station II, in the manner outlined above, cam 126 thereon closes switch 105, energizing relay 170 and closing all contactors thereof. Thus, just before the car has arrived at its stopping position at station II, and just before relay 14 is deenergized, a circuit is established for momentary energization of relay 154. This circuit is traced from energized circuit 250—UP through contactor 14B, through conductor 62, through contactors 22B, 5E, 26B, 12B, 179A, 101B, 103K, and 104B to the coil of relay 154.

With momentary energization of relay 154, relays 152 and 159 are momentarily energized through contactors 154A and C, respectively. Relay 158 remains energized upon the opening of contactor 152A, because contactor 154B closes in shunt with contactor 152A prior to the opening thereof. With the temporary energization of relay 159 through contactor 154C, a circuit from the positive supply conductor is established for the moment through contactors 158B and 159A which has the same effect as a momentary closure of switch 211. This circuit condition with relay 154 energized and relays 158 and 159 energized through contactors 154B and 154C, respectively, is ended by the opening of contactor 14B when relay 14 is deenergized, as the car, arriving at station II, actuates switch 108, so that all of relays 151—159 are thenceforth idle.

While the car is in the region of station II, with at least one of switches 105 and 107 closed, relays 170 and 171 are energized and through contactor 170F and conductor 611, relay 167 is energized, preventing any signalling of send-return calls at station II while the car is there.

The momentary circuit through relays 158 and 159 shunting the first floor call switch 211 establishes a momentary circuit through switch 114 to the coil of relay 6. This relay is then held energized through contactor 6D and switch 114.

After the car has remained at station II the predetermined time for which relays 24 and 23 are set, the armature of relay 24 returns to its normal deenergized position. Circuit conditions are thereupon established for returning the car to station I in response to the "-send" portion of the "call-send" order signalled through switch 221.

The coil of relay 6 being energized with its upper end at the position supply potential, a positive circuit is traced therefrom through contactor 6C, through conductor 100, contactors 104L, 103I, 102K, 13E, 21D, over conductor DN, through 23B, 24B and 28E to the coil of relay 25, whence the circuit is continued to the negative supply conductor through contactors 26B and 28D.

Circuits are thereupon set up through relay 25 for holding relays 27 and 30 energized, and for holding down power control relay 31 energized through relay 27. With these circuit conditions established, the car is propelled downward to station I.

As the car approaches station I, car relay 30 engages the station I hatchway cam 128; then car cam 126 closes switch 121 and thereafter switch 115, through the latter energizing relay 23 through conductor SD, and thereafter opens switch 114 opening the circuit of relay 6. With the energization of relay 23, the DN circuit to relay 25 is opened, and with the opening of switch 114, the holding circuit of relay 6 is opened. Relay 25 is deenergized, but relay 27 remains energized through contactors 30A and 27A thereafter, and until the mechanical armature actuator of car relay 30 rides clear of the station I hatchway cam 128. The time delay relay 23 is delayed in reclosing after being energized through contactor 6D and switches 114 and 115, insuring that the car must remain at station I at least for the minimum time interval for which relays 23 and 24 are set.

With the closure of switch 121, relay 166 is energized, blocking any send-return signalling from station I while the car is there.

Now, returning to the initial conditions with the car below station II, suppose that in addition to the last described signal call through switch 221, a further order was signalled through switch 330 by a person in the car desiring to be lifted to station III. The manner in which the latter call takes precedence by being a higher up-call, and compels the car to by-pass station II and to postpone its response to the 221 switch order, will now be described.

The 221 switch order results as described above in momentary energization of relay 14 through contactor 10C (relay 10 being energized and relay 9 being non-energized as a result of switch 108 being in the throw resulting from the car being beneath station II), whereupon a holding circuit is provided for relay 14 through contactors 10B and 14E. Also, as described above, the momentary closure of switch section 221 provides momentary energization of relay 158 through contactor 167C, so that a holding circuit for relay 158 is provided through contactor 152A.

The car being beneath station II, it necessarily is beneath station III likewise, so that switch 109 and switch 111 are in the respective right-hand contact throws, so that the coil of relay 16 is energized and the circuit to the coil of relay 21 is blocked by non-energized relay 17, preventing it from being actuated by the depression of switch 330. Relay 16 being energized through switch 109, however, provides a circuit momentarily traceable from the positive supply through switch 330, through conductor 3FL and contactor 16D to the coil of relay 20, the opposite end of which is connected to the negative supply conductor, so that relay 20 is then energized. From the positive supply conductor through contactors 16B and 20G, a holding circuit is established for relay 20. The energization of relay 20 opens contactor 20E, and thus prevents establishment of the required circuit for energizing coil 26 in response to the holding condition in relay 14 existing, as described above, due to the depression of switch 221.

Thus, in response to the third floor signal, relay 20, being energized, insures priority of response of the car motive system to the third floor order in preference to the second floor down-direction order. Hence, the car will by-pass station II in going up to respond to the higher call at station III.

From the positive conductor, a circuit is now traced through contactors 104N, 102B and 101C, by way of conductor 350, thence through contactor 20D to normally closed contactor 12E. From this contactor, one branch circuit proceeds through contactors 13H and 14G to the coil of relay 14, and thence to the negative supply conductor, holding relay 14 actuated now independently of the momentary actuation circuit through switch 220D and independently also of the holding circuit through contactor 10B. The other branch from contactor 12E proceeds through contactors 24C, 23C and 27E, providing an energization circuit for the coil of relay 26 which is traced onward through conductors 25B and 27D to the negative supply conductor. Relays 28, 30 and 32 are now energized in the same manner as described above as occurring in response to the sole depression of 220D, so that propulsion of the car upward is commenced.

As the car passes station II, the car cam 126 operates double throw switch 108 in the manner corresponding to a transfer of the schematically indicated switch arm first to neutral and later to the left, deenergizing relay 10 and energizing relay 9. Deenergization of relay 10, however, does not interrupt the circuit conditions essential for the continued actuation of relays 26, 28, 30 and 32, and accordingly the car is propelled continuously upward past station II.

The "-send" part of the "call-send" signalling effected through switch 221 is not given full effect upon the upward non-stop passage of the car by station II. The holding circuit remaining effective in relay 158 is prevented from setting up a station I call condition in relay 6 by the open condition of contactor 20B resulting from the fact that relay 20 is energized to bring the car up to the third floor.

As the car passes station II, cam 126 clears switch 108, with the result that the schematically indicated contact arm thereof is transferred from neutral to the left-hand position, and relays 9 and 13 are energized, the circuit for the latter being traced from the positive supply conductor through contactors 14F and 9A. A circuit is then provided through contactors 9B and 13G for holding relay 13 energized. With these energizations of relay 9 and thence relay 13 upon passage of the car upward past station II, new circuits are established to provide for return of the car to station II.

As the car approaches register with station III, the cam actuator of relay 30 engages hatchway cam 131 at station III, and shortly thereafter car cam 126 engages switch 112, resulting in the closing thereof. From the system diagram of Fig. 2, it will be evident that as the car ascends, cam 126 actuates switch 112 shortly before it reaches double-throw switch 109.

Through switch 112, relay 172 is energized. Through 172C, through contactors 16F, 19C and 20F the SU circuit is energized to actuate relay 24 and break the supply holding circuit of relay 26. Through contactor 172E, relay 168 is energized, to prevent signalling of any send-return signals while the car is at station III. Also, relay 173 is energized through contactor 172F. The consequent opening of contactor 173A ends the energization of relay 16. This opens the supply circuit of relay 20.

With the opening of contactor 20D, the current to the coil of relay 14 is interrupted, so that the call formerly held in relay 14 is now held only in relay 13. This relay continues holding the down call originated through switch 221.

As the car moves on into the position of full register with station III, the cam actuator of relay 30 moves off the station III cam 131 permitting contactor 30A to be opened and again breaking the chain of circuits of relays 24, 26, 29, 30 and 32, and bringing the car to a full stop at station III.

If the reclosure delay interval of relay 24 passes without any other call being signalled to bring the car further upward (i. e. to station IV), then upon the full reclosure of relay 24, the car will be made to proceed downward by the circuit traced over conductor 250 through contactors 104C, 103A, 101N, 13D, 21D, over conductor DN, through the delay relays to relay 25.

Through relay 25, as outlined above, relays 27 and 30 are energized; and through relays 27 and 30 and 29, relay 31 is energized with the result that the car is propelled downward. Upon approaching station II, relay 30 first engages cam 130, and then cam 126 engages switch 107, closing this switch and energizing relay 170 and energizing the SD circuit through contactors 170D, 9F, 14D and 13F, so that relay 23 is energized. The consequent opening of contactor 23B interrupts the circuit DN through which relay 25 has been energized, but relay 30, with its contactor held closed by cam 130, holds relays 27 and 31 energized until the car reaches the position of full register at station II.

Relay 171 is provided with a delayed action mechanism for delaying the opening of normally closed contactors 171A and 171B when the coil is energized. Such delayed action mechanism, which may be of any of the well known types, is illustrated as comprising a dash-pot system, it being understood that a valve may be included in the piston thereof to limit the time delay effect to the response of the armature switch elements to an energization of the relay.

Contactor 171A is connected in the energization circuit of relay 8, and contactor 171B is connected in the energization circuit of relay 9.

Upon the closure of switch 107 as the car in its descent approaches the position of register at station II, and the actuation of relay 170 immediately thereupon, the coil of relay 171 is energized. Because of the delayed armature action, however, there is a brief delay before relay 9, and relay 13 supplied therethrough, are deenergized. During this brief interval, circuit 82 to relay 154 is energized from conductor 250 through contactor 13B (not yet reopened) and newly closed contactor 170A.

The need for this delayed action of relay 171, and the extent thereof, is dependent on the action of relays 171, 9, 13, and 154. If the successive actions in relays 171 and 9 and 13 require enough time for the positive actuation of relay 154 and relays 152, 158 and 159 operating therethrough, no special mechanism for additional delay need be provided in relay 171.

Relay 173 performs similar functions in the station III control circuits to the functions of relay 171 in the station II control circuits, and accordingly, this relay should have the same operating time characteristics as provided in relay 171.

Upon the opening of contactor 171B, relay 9 in turn opening relay 13 and breaking circuit 82 at 13B, and station I call relay 6 is energized through relays 158 and 159 as heretofore described. With the interruption of the supply circuit to relay 154, relays 158, 159, 154 and 152 are all restored to their non-energized conditions, as described in the first illustration of operation of the system in response to a call-send switch order.

After the car has waited at station II for the time corresponding to the delay adjustment of relay 23, contactors 23B and 23C reclose in succession, and with the reclosure of contactor 23B, the circuits for relays 25, 27, 30 and 31 are again established as a result of the holding condition in relay 6. The complete procedure of the car control system, down to the stop of the car at station I with relays 6, 23, 30, 25, 27 and 31 deenergized, relay 30 being open with its cam actuator below cam 128, and relay 23 having its armature retained in energized position by its delay mechanism is thus carried out as described heretofore.

It should be noted that in descending from station III to station II, stopping there to permit entrance, and proceeding onward to station I, all in response to the "call-send" order signalled through switch 221, one direction of car travel is retained. Another call, e. g. a station IV call signalled prior to the arrival of the car at station II, cannot take precedence unless signalled as an emergency or express call. This is insured by the reclosing of contactor 23B just prior to the reclosing of contactor 23C, so that the station I call held in relay 6 is given priority over any ordinary up call, such as a station IV call in relay 5, even if such up call were signalled before the arrival of the car at station II and the institution there of the station I call condition in relay 6.

Suppose with the above illustrated conditions— the car having been initially at station I, having been called therefrom to station II with the station II-station I "call-send" order, and then having been caused to proceed directly to station III by a person in the car—that just after the arrival of the car at station III, an emergency express order was signalled for the car to proceed forthwith to station I.

The system is so designed that in response to such an order, signalled either through car switch 310E or station switch 210E, the car is made to proceed downward non-stop to station I, by-passing the call-send conditions at station II. These conditions are retained, to provide for a subsequent ascent of the car to station II, with the station I "-send" condition, held up to that time in relay 158, then being given effect in setting up a holding condition in relay 6, so that the final phase of the operations is completed with the descent of the car to station I.

In the above-outlined process is included the special steps of blocking the circuit for actuation of relay 154 as the car by-passes station II en route to station I, and the retransfer of the above-described station II call holding circuits from relay 13 back to relay 14, where the holding circuit was originally instituted.

It is to be noted that two protective features are included for preventing the express switches from causing undesirable effects. The first of these features is the inclusion of normally closed contactors 32C and 31C in the circuit from the positive supply main to the express signalling switches, preventing an actuation of an express relay and a consequent arresting of the car while it is travelling in the hatchway between stations.

The second of these features is the inclusion of normally closed contactors 166D and 169D in the coil actuation circuits of express relays 101 and 104 respectively, preventing the misuse of a terminal station express switch for setting up a recall circuit for the terminal station at which the car is situated.

Such misuse of express switches for setting up recalls to the intermediate floors is prevented without additional contactors on relays 167 and 168, because when the car is at an intermediate station the two double-throw switches and the four relays controlled therethrough are all open, so that no holding circuit can be made under these conditions for the corresponding express relay. For example, with the car at rest at station III, double-throw switches 109 and 111 are both neutral, and hence relays 16 and 17 are both deenergized. Accordingly, relays 20 and 21 are deenergized, since their holding circuits are dependent upon energization of the respective ones of relays 16 and 17.

Returning now to the use of normally closed contactors 32C and 31C in series with the signalling switches for express relay actuation, while these contactors prevent any effect being accorded to a momentary depression of an express signalling switch while the car is in transit, the desired result may be be obtained if the car is in motion by holding the express switch depressed until the car comes to a halt or by waiting until the car stops and then depressing the switch.

While the express signal is given priority over all other orders signalled for the car, it is not desirable to have it in any way interfere with the car remaining for the full extent of the predetermined minimum time interval (the delayed reclosure time of relays 23 and 24) at the station at which it had arrived when the express signal is given effect through contactors 32C and 31C. Relays 23 and 24 are effective for this purpose, since no circuits are included in connection with the express relays 101, 102, 103 and 104 which would in any way circumvent the delaying action of these two relays.

Referring specifically now to the circuit conditions prevailing as a result of the interposition of the emergency express order signalled while the car was at station III, a circuit is established from the positive supply conductor through contactors 32C, 31C, conductor 710, and either switch 310E in the car switch panel or switch 210E in the station I button switch panel (the latter preferably being actuatable only by a suitable key-lock switch device), to contactor 166D. The car being absent from station I, relay 166 is deenergized and contactor 168D is closed, so that the circuit is completed through conductor IE and contactors 102G, 103G and 104I to the coil of relay 101, momentarily energizing this relay. From the positive supply conductor, an energization circuit to relay 6 is then completed through contactor 101K, conductor 1FL, and switch 114, and a holding circuit for relay 6 is provided through contactor 6D and switch 114. Relay 101 is held energized over circuit P1 by current flowing from the positive supply through contactor 6D, switch 114, and contactor 101I.

Contactor 101N blocks the power circuit for energization of relay 25 or 26 through any of the station II call holding relays 11—14; and relay 101 provides its own power circuit to relay 25, which is traced from energized conductor P1, through contactors 101I and 101M, through conductor 510 and conductor DN. Therefore, the car is compelled to go directly down to station I.

Upon the energization of relay 101, as aforementioned, with a now superceded holding circuit in relay 13 calling for the car to come to station II and stop there, a new circuit is traced from the positive supply conductor through contactor 101F, through conductor 200, through contactor 13A to the coil of relay 14, which is thus energized. Upon the energization of relay 14, contactor 14A shunts contactor 13A, so that relay 14 will be held energized through contactor 101F and conductor 200 thereafter independently of relay 13, until the car has proceeded a slight distance below the position of register with station II and the arm of switch 108 as schematically represented has been transferred to the right. A holding circuit for relay 14 is then provided through contactors 10B and 14E, which is independent of the actuation of relay 101.

Thus, where relay 14 was originally energized to call the car up to station II, its holding circuit was terminated with a transfer to a holding condition in relay 13 when the car by-passed station II in response to a farther call in its direction of travel, and a reverse transfer was subsequently accomplished where the car again by-passed station II in downward travel in response to an express call to station I.

As the car passes by station II in this descent, relay 154 is prevented from being actuated by the open conditions of contactors 101N and 101B, both of which are included in series with the circuit 82 for supply of relay 154. Hence, the holding circuit in relay 158 remains intact, and the "-send" part of the station II-station I "call-send" order is not signalled through at this time.

As the car approaches station I in this descent, the mechanical actuator of relay 30 rides onto cam 128, and then cam 126 first engages switch 121 and then switch 115 and finally switch 114. Through switch 121, relay 166 becomes energized, to remain so and to block the improper use of any of the three call-send switches 212, 213 or 214 as a mere sender element for directing the car to proceed from this station to any other station. Relay 162 is actuated also through switch 121, over a circuit through contactor 6E of the station I call relay. In the absence of any call holding condition previously established in any of the relays 160, 163 or 165 for call-send operation to corresponding ones of the upper floors, this operation of relay 162 for the brief interval after actuation of switch 121 and until deenergization of relay 6 is without any material effect upon the operation of the control system.

Upon the closing of switch 115, relay 23 is energized over conductor SD, breaking at contactor 23B the actuation circuit to relay 25 and causing the opening in turn of the circuits to relays 27 and 30, and leaving the continued downward propulsion of the car dependent upon the mechanical holding of the relay 30 which continues until the car reaches the position of full register at station I, at which the actuator of relay 30 rides off the lower end of cam 128. Cam 126 opens switch 114 before this point is reached, and the opening of this switch breaks the holding circuits of relays 6 and 101 and also ends the energization of relay 23, starting the delayed reclosing cycle thereof.

At the end of the delayed reclosing time of relay 23, the car will proceed upward, to stop at station II in response to the call held in relay 14, and upon approach to the position of register there, the succession of circuits culminating in actuation of relay 159 through relay 154 and the actuation of relay 6 through relays 158 and 159, followed by the opening of the circuits of relays 154, 152, 158 and 159, will occur just as described in the second illustrative example of the operation of the system, in response to an original call through "call-send" switch 221.

When two "call-send" orders have been signalled at one intermediate station, one specifying a higher destination and one specifying a lower destination, a situation exists which requires full satisfaction of one of the "call-send" orders followed by full satisfaction of the other. The one which will be satisfied first is that one involving travel from the call station to the destination in the same diretcion as the direction of arrival of the car at the call station.

When a plurality of "call-send" orders have been signalled at one station for a plurality of destinations in one direction therefrom, all of these orders are partially satisfied by a stop of the car at the call station, permitting the passengers for the various destinations to enter the car together, and the response to the orders is completed by the successive stops of the car at the several destinations.

All of these conditions may be illustrated by assuming the car at station I and examining the operation of the system in response to a group of three "call-send" orders all placed at station II—one through switch 221 for station I as the destination, one through switch 223 for station III as the destination, and one through switch 224 for station IV as the destination.

The momentary depression of switch 221 provides two holding circuits as heretofore described, section A of the switch providing a holding circuit in relay 14 traced through contactors 10B and 14E, and section 221B providing a holding circuit in relay 158, traced through contactors 152A and 158A. Assuming that the other "call-send" signals are to be signalled thereafter, the cam commences its trip up to station II by virtue of the circuit traced from the positive supply main through contactors 104C, 103A, 101N, 14C, 22C, 5C, 103B, 102D, 101E, 20E and 12E, through conductor UP and contactors 24C, 23C and 27E to the coil of relay 26.

Now, assume that switches 223 and 224 are momentarily depressed while the car is in its ascent toward station II. Through contactor 223A, a circuit is traced over conductor 2HU, through contactor 8C of energized relay 8 (the switch arm of schematically-indicated switch 106 being to the right with the car below, relay 7 is non-energized, and contactor 7C is open) to the coil of relay 12, which is then energized. A holding circuit for relay 12 is then provided through contactors 8B and 12H.

Arm B of double-pole switch 223 energizes relay 156 through contactor 167B, and relay 156 thereafter is held energized through contactors 151A and 156A.

The depression of switch 224 provides through 224B a similar momentary energization of relay 155, which is then held through contactors 151A and 155A. Contactor A of switch 224 merely shunts contactor 223A, and since relay 12 is already held energized by virtue of the momentary closure of contactor 223A, the momentary closure of contactor 224A has no further effect.

The energized condition of relay 12 interrupts the circuit traced above through contactor 14C to relay 26, since normally closed contactor 12E was included in that circuit. A different circuit for energization of relay 26 is substituted, this circuit being traced from positive through contactors 104C, 103A, 101N, and 12D, through conductor UP, through contactors 24C, 23C and 27E to relay 26.

Now, contactor 12D being at positive supply potential, a circuit is traced therefrom through contactors 13H and 14G to the coil of relay 14, holding this relay independently of the relay 14 holding circuit through contactor 10B.

As the car approaches the position of register with station II, the actuator of relay 30 engages cam 129, and next cam 126 engages switch 105, closing it and energizing relay 170, and in turn energizing circuit SU through contactors 170C, 8F, 11E, and 12F, so that relay 24 is energized, breaking the circuit to relay 26. As heretofore explained, however, relay 30 has meanwhile engaged cam 129, so that this relay is held closed and it in turn holds relays 28 and 32 energized, until the car is driven to the position of register at station II with the relay 30 actuator between cams 129 and 130, and stopped.

Meanwhile, relay 170 having become energized as mentioned above, the circuits described formerly for energization of relay 154 would be established as the car approached register at station II except for the open condition of contactor 12B due to the fact that relay 12 is energized. On the other hand, relay 153 is energized at this time, through conductor 81, by a circuit traced from energized circuit 250, through contactors 12G, 170B, 101A, 103L and 104A.

With momentary energization of relay 153, relays 151 and 157 are momentarily energized through contactors 153A and 153C, respectively. Relays 155 and 156 remain energized upon the opening of contactor 151A, because contactor 153B closes in shunt with contactor 151A immediately prior to the opening thereof.

With the temporary energization of relay 157, a circuit is established for the moment through contactors 156B and 157B which has the same effect as a momentary closure of switch 230U, to establish a call holding circuit to bring the car to station III. Likewise, a circuit is established for the moment through contactors 155B and 157A and conductor 4L to establish a holding condition in relay 5 for a call of the car to station IV.

Through contactor 170E, relay 171 is energized. Accordingly, contactor 171A is opened, deenergizing relay 8, which in turn opens the actuation circuit of relay 12. With the consequent opening of contactor 12G, the power is removed from circuit 81, so that relay 153 and relays 151, 155, 156 and 157 are deenergized, returning to the quiescent conditions for receiving any subsequent call-send signals. With the institution of the station III send signal through conductor 81, a new call is set up in relay 20. Relay 20 takes over on the job of blocking circuit 82 at 20B, just prior to the deenergization of relay 12 by the successive actuation of relay 171 and deenergizations of relays 8 and 12.

Likewise, with the energization of relay 5 as described above, contactor 5E opens, also insuring against completion of the circuit 82 to relay 154 at this stage of operation of the system.

Now, relay 20 being energized, a circuit is traced from the positive supply conductor through contactors 104N, 102B, 101C, via conductor 350, through contactors 20D and 12E, to the conductor marked UP leading to the delay relays and relay 26, placing this UP conductor at positive supply potential.

After the predetermined wait at station II while relay 24 recloses, the energized UP circuit is again completed through relay contactors 24C and 23C and 27E to relay 26, and the car is again propelled upward. As the car departs, it permits first switch 106 to reclose in the left-hand throw, and then switch 108 to reclose in the left-hand throw. Relay 7 is thus energized.

As the car moves on upward, cam 126 clears switch 107, allowing it to reopen, and resulting in the successive deenergizations of relays 170 and 171. Through the latter, relay 9 is now energized. With the energization of relay 9, relay 13 becomes energized through a circuit traceable from the positive supply conductor through contactors 14F and 9A to the coil of relay 13, whereupon a holding circuit therefor is established through contactors 9B and 13G, as heretofore described.

Now, at this point, the car is in progress toward station III with the passengers for stations III and IV. It will stop at station III, permitting the passengers for station III to emerge, and then proceed to station IV as the destination for the respective passenger. Thereafter, the call now held in relay 13 will be satisfied by a stop of the car at station II, and as the car approaches station II in its descent thereto, the signal circuit from relay 158 to relay 6 is completed, signalling in the call-holding circuit for the first passenger's destination, i. e. station I, as heretofore described.

The foregoing descriptions include several examples of operation involving station I calls held in relay 6, station II calls held in relays 13 and 14, station III calls held in relay 20, and station IV calls held in relay 5. The present arrangement with its complete call-send signalling arrangements and express by-pass arrangements for four stations or floors is capable of holding a very large number of calls at one time, and furthermore, it is obviously capable of receiving a very wide variety of combinations of two or more calls. The foregoing examples have been selected to illustrate typical operating features of the system.

Relay 14 at station II, and relay 22 at intermediate station III serve similar functions, in that the respective ones of these relays are arranged to receive calls to bring the car upward to the respective intermediate stations, to make it available for a trip downward. Relays 19 and 11 may be considered as counterparts of relays 14 and 22 respectively, for holding calls to bring the car down to station III or to station II when the car is above the station to which it is called, the car to be available at the calling station for a trip in the reverse direction, i. e. for an upward trip. The terminal relay 6 for holding calls to the lower terminal station and terminal relay 5 for holding calls to the upper terminal station operate similarly in all respects, the principles of operation for either of these terminals applying to the other.

Relay 12 is arranged to hold calls for bringing the car upward from the lower terminal floor, where the car is to be used for a further upward trip; and relay 20 is provided for holding calls to station III from any station therebeneath where the car is likewise to be used for an upward trip.

A call held in one of these relays will bring the car to the station and stop it there, irrespective of further calls for the car in its direction of travel; and in this way the operation in response to a call held in relay 12 of relay 20 is in contrast to a call held in relay 14 or relay 22, signifying the requirement for the car to come and make a stop at the station for availability to proceed to a destination in the direction opposite to the direction of arrival. Since relays 12 and 20 are provided primarily for receiving calls for direction continuance, and hence calls which are not to be by-passed under any circumstances except by an express or emergency call signalled through relay 102 or relay 104, these relays are also arranged to receive ordinary calls signalled through the car switches 320 and 330 for bringing passengers in the car to station II and III, respectively, from below.

Relay 21 is provided for holding a call to bring the car downward from the upper terminal station to station III to provide for a further downward trip of the car, and relay 13 is provided for holding a call to bring the car downward to station II from a station thereabove, for availability for a subsequent trip to a station beneath.

Relays 13 and 21 are arranged to receive and hold calls for bringing the car downward to station III and station II respectively, where such calls are made without further trip purpose, as where a passenger in the car signals for the car to proceed to station III or station II to permit him to leave the car. Thus, if the car is below station II and a passenger in the car signals to proceed to station II by a depression of switch 320, relay 13 is actuated through relay 9 which latter relay is energized through switch 108. Similarly, the depression of switch 330 when the car is below station III acts through relay 17 to provide the required call holding circuit in relay 21. If the car is above the intermediate station for which the car destination button 330 or 320 is depressed, on the other hand, a holding circuit will be provided in relay 20 or in relay 12, respectively named. As is apparent, the principles of operation applying to relays 12 and 20 for upward trips of the car apply equally to the operation of relays 21 and 13 for downward trips; and similarly, the operating principles of relays 14 and 22 for upward trips, susceptible of being by-passed by the car en route to answer higher calls of ordinary character, apply equally to the operation of relays 19 and 11 for downward trips of susceptibility of being by-passed (with conversion over to the up-call holding relays 20 and 12, respectively) by the car en route to answer lower calls.

The four express relays are connected in generally similar circuit arrangements, so that the description of operation of one of these relays set forth above is generally applicable to any of the others. Only one express or emergency call can be received by the system at any one time, since an attempt to handle two such calls would involve such a conflict as to result in a stalemate. For insuring against this condition, the energization circuit for each express relay passes through normally closed contactors of the other three express relays.

Upon the actuation of any express relay, a holding circuit is instituted therefor which will be broken by the opening of a cam switch at the corresponding station upon the arrival of the car at that station, as illustrated with respect to relay 101. It will be noted that each of the express relays includes normally closed contactors in series with the various power circuits for stations other than the respective stations for which the relays are provided, so that the car is prevented from responding to the ordinary calls held therefor during the holding of the express relay, and hence, until the car has responded fully to the express call.

As illustrated in the foregoing examples, with all by-pass operations of the car, passing by a call at an intermediate station either to answer a call beyond when the intermediate call is for the direction opposite to the direction of arrival or because the car is travelling express under compulsion of an emergency call signal, the calls for the intermediate stations are nonetheless fully preserved by relay transfers, so that they will be responded to subsequently to the completion of the car trip on which it by-passes the intermediate station.

It will further be observed that similar sets of the relays for holding and timely responding to the "-send" portions of the "call-send" signals are provided at the lower terminal floor and the upper terminal floor, and the group of nine relays for this purpose at intermediate stations III are similar to the set of nine such relays at intermediate station II. The operating principles of these relay groups at stations I, III and IV are the same as set forth above in detail as to station II.

Since the car can only be sent in one direction from a terminal station, just one set of three relays is provided at each terminal station for cooperating with the three respective floor relays of the call-send relay banks.

Relays 166, 167, 168 and 169 at stations I, II, III and IV, respectively, include normally closed contactors in the various call-send switch circuits, and these relays are arranged to be actuated during the presence of the car at the respective stations. Relays 166 and 169 at the respective terminal stations are connected for operation directly through cam switches 121 and 124, whereas relays 167 and 168 at the intermediate stations are operated for so long as the car is in their respective vicinities. Relay 168 is operated through relay 172 which in turn is operated so long as cam 126 is in contact with at least one of switches 110 and 112, just as relay 167 is operated through relay 170 when one or both of the single-throw switches at station II is engaged by cam 126. Thus, a call-send signal may be fully effectuated at any time when the car is absent from the station at which a call-send switch is depressed. On the other hand, when the car is present at a station, a passenger at that station is prevented from employing a call-send switch 242 at the third floor for the to another station, he must instead proceed in the normal manner by entry into the car and depression of one of the signal switches therein.

Depending upon the types of relays available, number of types of contactors thereof and current capacity thereof, some reduction can be made in the number of relays required to carry out the circuit functions of the present invention. For example, relay 159 in the station II circuits may be eliminated and a normally open contactor on the armature of relay 154 may be substituted in the circuit for contactor 159A. Similarly, relay 157 may be eliminated if two normally open contactors on relay 153 are connected in substitution for contactors 157A and 157B. Similar changes may be made in the call-send circuit arrangements for stations I, III and IV.

It will be readily apparent that where the demands for an elevator system are not such as to require so extensive a set of controls for each of the several stations, such control switches as are not needed may readily be eliminated and any control relay operated only through those control switches may likewise readily be eliminated.

The elevator control system shown in the five sheets of drawings which together comprise Fig. 1 is arranged to be inclusive of a very large number of important features, for completeness in setting forth the principles of this invention. It will readily be appreciated that in some instances a practical elevator installation may lack any requirement for express or emergency super-control operation, and where such is the case, relays 101, 102, 103 and 104 are to be eliminated, along with switches 219E, 220E, 230E, 240E, 310E, 320E, 330E and 340E. Such omissions of the express priority control relays is perfectly straightforward, as all normally closed contactor circuits are made continuous just as though the express relay were built into the system and its armature were locked in non-energized position; and the conductors to the normally open contactors are merely eliminated.

All types of hallway control switches are shown at each of the stations, to insure that the circuit diagram be inclusive of any desired combination of control elements. Whereas a complete set of call-send switches are shown at station II, for example, along with "up" and "down" directional calling switches, it is unlikely that both sets of switches would be desired to be included at this station. Obviously here, also, such switches as are not required may readily be eliminated, and where the elimination of certain call-send switches is involved, accompanying relays are also eliminated from the system.

Fig. 3 illustrates one selection of control switches for the hallways of an apartment building of three floors and a basement, wherein call-send signalling to the main floor only is provided at the basement, second floor and third floor. The main floor station (corresponding to station II as referred to throughout the foregoing descriptions) is provided with a call-send switch for each of the other floors, together with a mere call switch to be available for unusual conditions such as a requirement of the car at the main floor for repair work.

The switches in the various hallway switch panels are numbered in the same way as the corresponding switches of Fig. 1, thus making it clear that a very large number of the hallway switches of Fig. 1 are obviated for this particular system installation.

Assuming that no need exists for provision of express relays, the system is simplified to a considerable extent by the elimination of relays 101—104. At the upper terminal station (the third floor, corresponding to station IV), one switch only is provided, a call-send switch 242 for affording prospective passengers the ideal facility for calling the car for access thereto and directing it to take them to the main floor, all by a single signalling operation.

Similarly, a single call-send switch 232 is provided at the second floor (station III), for calling the car there and directing it to convey the caller to the main floor. This switch and the similar call-send button in the hallway to direct the car main floor as the destination conform well to the pattern of the great majority of the demands for the car to come to upper floors of apartment buildings to pick up passengers.

Station IV call-send relays 136, 138, 149, and 140 are retained for operation in connection with switch 242, but relays 137 and 141 are eliminated, as are switches 240E, 241, 243 and 244. Relays 146, 147, 148 and 150 of the station III call-send system are retained, but relays 142, 143, 144, 145 and 149 are eliminated, along with switches 230E, 231, 233, 234, 230U and 230D.

At station I (the basement), a call-send switch 212 is provided for the main floor as the destination, switches 210E, 211, 213, and 214, and relays 160 and 163 being eliminated.

All of the station II call-send relays are retained for the main floor, along with switches 221, 223 and 224, but switches 220E, 220U and 220D are eliminated.

The car panel of switches 310, 320, 330 and 340 is retained, switch 500 being included for stopping the car in event of a contingency. These switches in the car are available to the passengers upon entry for signalling their occasional demands for use of the car beyond the normal pattern of demands, e. g. for signalling the car to take them from the second floor to the third, or from the third floor to the second, or from either of these floors to the basement, or from the basement to one of the upper stories of the building. Obviously, if preferred, switches 213 and 214 and the cooperating relays 163 and 160 may be retained at the basement floor if it is considered justifiable to provide this further convenience for tenants using a basement laundry or playroom or garage, to afford them ideal facilities for call-send signalling for trips directly to their upper floors.

Fig. 4 illustrates a somewhat different selection of control units, shown as arranged for a four-story apartment building or commercial building without a basement elevator station. In this example, call-send switches are provided at the main floor only (station I), and the switches at the other floors are direction-selective call signalling switches, only.

For this installation, the relays numbered consecutively from 136 to 159, inclusive, are eliminated, as are also relays 167, 168, and 169, and switches 124, 210E, and all hallway switches at the second, third and fourth floors except the switches bearing the numeral designations set forth in Fig. 4. Again, if no express or emergency super-control features are needed, switches 310E, 320E, 330E and 340E are eliminated from the control panel in the car.

This installation provides for single-signal operation from the lobby or main floor of the building, but a passenger who gains access to the car at an upper floor is of course required to enter a further signal to set up circuits for taking him to his destination.

It will be readily apparent that the express relays may be retained with either of the systems of Figs. 3 and 4, and that button switches therefor may be provided in the car, or at the hall stations, or in both positions as shown in the main circuit diagram.

Obviously, many other selections of control units may be made from the overall system of Fig. 1, with the elimination of such controllers as are deemed unnecessary or even undesirable in the varied situations of elevator service requirements.

The present invention has been illustrated as applied to a four-station installation, but it will be readily apparent to those skilled in the art that it may be modified for serving only three stations, eliminating the bank of eight relays designated by the series of numbers 15-22 inclusive, and eliminating also relays 172 and 173, and the hatchway cams and switches associated with these ten relays. If full express by-pass provisions are required, furthermore, relays 101, 102 and 103 are retained and relay 103 is eliminated.

Where full call-send control at all floors is to be provided in such a three-story installation, relays 137, 168, 156, and 163 are eliminated, together with the set of nine relays designated as the series 142-150, inclusive, are eliminated, and the remaining control elements are retained.

Conversely, the system may be expanded to accomodate a larger member of floors by the addition of a further bank (or a plurality of further banks) of intermediate floor relays similar to relays 15-22, 172 and 173. If full call-send control at all floors is desired, an additional bank of relays like relays 142-150 and 168 are added, and an additional relay is required at each station in order that there be a send-order holding relay thereat for each of the four other stations then included. The corresponding expansion of the system of express relays also is obvious, with one further express relay being provided in this bank for yielding emergency priority to calls for the added intermediate floor.

Throughout the foregoing description of the elevator system embodiments shown in Figs. 1 and 2, the car has been referred to as provided with a switch-actuating cam 126, thereon, and with a relay having a cam actuatable armature switch element also positioned on the car, for actuation by hatchway cams. These features are merely illustrative, and wide variations may be made in the operating principles as well as the cam details, without departing from the important novel features of the present invention.

For example, where reference is made to positioning of switches in the hatchway and operation thereof by cams upon the car, it will be appreciated that such operation may be achieved remotely from the hatchway, as in miniature geared-down and coupled relatively movable parts. As one example, a miniature dummy car may be coupled to the main car for scaled-down movements along an appropriately scaled hatchway, oriented vertically or otherwise as desired, and the cams and control switches may be associated therewith to provide for greater compactness of the control circuits. Similarly, a coupled control unit bearing cams corresponding to the car cams and the hatchway cams may be made angularly movable, if desired, with control switches placed at appropriate angles about the axis of rotation, and with suitable gearing to the car suspension system to insure the positive maintenance of the desired relations between linear car movement and the angular movement of the cam bearing unit. Relay 30 may also be made stationary, and a series of cams spaced apart in scalar correspondence with the six hatchway cams 128-133 of Fig. 2, may be propelled along relative thereto.

Moreover, the cams may be replaced if desired by units obviating physical contact with the hatchway control switches, as by photoelectric, magnetic, or capacitive operating arrangements of well-known types.

Furthermore, the present control system is not limited to any type of propulsion system, since relay 31 may be employed to institute down propulsion of any type of car motive system, and similarly relay 33 may be arranged to institute upward propulsion of whatever motive system is employed.

The present invention is not limited to operation with direct current-actuated relays throughout, such as are illustrated in the drawings. It is equally capable of being carried out with alternating current operation of the relays; with relays of this type, the supply points designated "+" would merely correspond to the one supply conductor of the alternating current supply circuits.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to a call signalled through said first-named means for establishing and holding a first circuit condition to cause the car to be propelled to said one station and for establishing and holding a second circuit condition for thereafter causing the car to be propelled to the designated station, means for signalling a call signifying a demand for the car to come to a further station, means responsive to said last-named means for establishing and holding a third circuit condition to cause the car to be propelled to said further station, and directional order control means operative during concurrent holding of said third circuit condition and at least one of said first and second circuit conditions for preventing said car from being propelled continuously past a station at which a call is held for a station therebeyond in the direction of progress of the car and for preventing the car from being stopped and reversed in the direction of propulsion until all standing calls for stations therebeyond in its direction of progress have been answered.

2. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to a call signalled through said first-named means for establishing and holding a first circuit condition to cause the car to be propelled to said one station, means coupled to said first circuit condition establishing and holding means for propelling said car to said one station and for terminating said holding condition upon arrival of said car at said one station, means responsive to a call signalled through said first-named means for establishing and holding a second circuit condition, means operable through said second circuit condition establishing and holding means upon arrival of said car at said one station for providing a third holding circuit condition for propelling said car to said designated station and for terminating said second holding circuit condition, means for signalling a call signifying a demand for the car to come to a further station, means responsive to said last-named means for establishing and holding a fourth circuit condition for causing said car to be propelled to said further station, and directional order control means operative during concurrent holding of a plurality of hold circuit conditions for preventing said car from being propelled continuously past a station at which a call is held for a station therebeyond in the direction of progress of the car and for preventing the car from being stopped and reversed in its direction of propulsion until all standing calls for stations therebeyond in its direction of progress have been answered.

3. A control system for a vertical lift apparatus as defined in claim 2, wherein said means operable through said second circuit condition establishing and holding means includes means for retaining said second circuit condition held intact and for blocking the establishment of said third circuit condition when said car passes by said one station in non-stop travel and when said car is stopped at said one station in travel in the direction opposite the direction of said designated station with a call requiring it to recommence travel in said direction opposite the direction of said designated station.

4. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to a call signalled through said first-named means for establishing and holding a first circuit condition to cause the car to be propelled to said one station and for establishing and holding a second circuit condition for thereafter causing the car to be propelled to the designated station, means responsive to arrival of said car at said one station for terminating said first circuit condition, and means responsive to arrival of said car at said designated station only after termination of said first circuit condition for terminating said second circuit condition.

5. A control system for a vertical lift apparatus of the type including a hatchway extending between an upper terminal station and a lower terminal station with at least one intermediate station and with a car guided in said hatchway and motor propelled for upward and downward movement therein, the control system comprising: first means at one of said intermediate stations for signalling a call signifying a demand for the car to come to said one intermediate station to be entered and to proceed thenceforth upward to a designated station thereabove, means responsive to a call signalled through said first-named means for establishing and holding a first circuit condition to cause the car to be propelled to said one station and for establishing and holding a second circuit condition for thereafter causing the car to be propelled upward to the designated station, means responsive to arrival of said car at said one intermediate station in response to said first call for terminating said first circuit condition, means responsive to arrival of the car at the designated station for terminating said second circuit condition, second means at said one intermediate station for signalling a call signifying a demand for the car to come to said one intermediate station to be entered and to proceed thenceforth downward to a designated station therebelow, means responsive to a call signalled through said second signalling means for establishing and holding a third circuit condition to cause the car to be propelled to said one intermediate station and for establishing and holding a fourth circuit condition for thereafter causing the car to be propelled downward to the designated station therebelow, means responsive to arrival of said car at said one intermediate station in response to said second call signalling means for terminating said third circuit condition, and means responsive to arrival of the car at said designated station therebelow for terminating said fourth circuit condition.

6. A control system for a vertical lift apparatus of the type including a hatchway extending between an upper terminal station and a lower terminal station with at least one intermediate station and with a car guided in said hatchway and motor propelled for upward and downward movement therein, the control system comprising: first means at one of said intermediate stations for signalling a call signifying a demand for the car to come to said one intermediate station to be entered and to proceed thence- means responsive to a call signalled through said means responsive to a call sigialled through said first-named means for establishing and holding a first circuit condition to cause the car to be propelled to said one intermediate station and for establishing and holding a second circuit condition for thereafter causing the car to be propelled upward to the designated station thereabove, means responsive to successive trips of said car to said one intermediate station and said designated station thereabove for terminating said first and second circuit conditions, second means at said one intermediate station for signalling a call signifying a demand for the car to come to said one intermediate station to be entered and to proceed thenceforth downward to a designated station therebelow, means responsive to a call signalled through said last-named means for establishing and holding a third circuit condition to cause the car to be propelled to said one intermediate station and for establishing and holding a fourth circuit condition for thereafter causing the car to be propelled downward to the designated station therebelow, and means responsive to successive trips of said car to said one intermediate station and said designated station therebelow for terminating said third and fourth circuit conditions.

7. A control system as defined in claim 6, further comprising means operative when calls have been signalled through said first and second signalling means prior to arrival of said car at said one intermediate station in response to one of said calls for compelling the car to respond first to that call requiring it to proceed onward in its direction of arrival and forestalling response to the call for the opposite direction until it has made successive stops at said one intermediate station and the designated station therebeyond.

8. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to a call signalled through said first-named means for establishing a first circuit condition requiring the motor to propel said car to said one station and stop and a second circuit condition requiring the motor to propel said car thence to said designated station and stop, and means responsive to successive arrivals of said car at said one station and said designated station for terminating said first and second circuit conditions.

9. A control system for a vertical lift apparatus of the type including a hatchway extending between an upper terminal station and a lower terminal station with at least one intermediate station and with a car guided in said hatchway and motor propelled for upward and downward movement therein, the control system comprising: means at each of said terminal stations for signalling a call signifying a demand for the car to come thereto to be entered, call-send signalling means at one intermediate station for signalling a call signifying a demand for the car to come to said one station to be entered and to proceed thenceforth to a first destination, first means responsive to said first call-send signalling means for holding intact an up propulsion circuit if the car is below said one intermediate station or a down propulsion circuit if the car is above said one intermediate station at the time of a signal through said call-send signalling means, second means responsive to said call-send signalling means for holding intact a holding circuit for said first destination, and means responsive to arrival of said car at said one intermediate station for establishing through said second holding means a call holding circuit for said destination and for terminating the propulsion circuit held in said first holding means to stop the car at said one intermediate station, to admit passengers there for said destination.

10. A control system as defined in claim 9, further including means for signalling a call for bringing said car directly past said one intermediate station to a designated station therebeyond, means responsive to said last-named means when a call-send signal has been given at said one intermediate station for substituting a holding circuit for returning said car to said one intermediate station from the opposite direction after it has proceeded past said one intermediate station to the station therebeyond, and means for blocking establishment of a call holding circuit through said second holding means during the passage of said car by said one intermediate station whereby establishment of the call holding circuit through said second holding means is postponed until the car stops at said one intermediate station.

11. A control system as defined in claim 10, wherein said means for signalling a call for bringing the car directly past said one intermediate station comprises an express call switch, and said means responsive thereto includes an express control relay including a holding circuit and also including a normally closed contactor which is opened to block the establishment of a call holding circuit through said second holding means, said express control relay being connected to bring the car directly to the station corresponding to said express control switch, regardless of whether the car is brought past the call-send destination before or after passage by said one intermediate station.

12. A control system as defined in claim 10, wherein said means for signalling a call for bringing said car directly past said one intermediate station to a designated station therebeyond comprises a call switch for said designated station, and said means responsive thereto comprises relay means operative when said car and the destination of a call-send signal are both displaced from said one intermediate station in the direction opposite from said designated station for holding a directional priority circuit closed as said car approaches and passes said one intermediate station and until it reaches said designated station.

13. A control system for a vertical lift apparatus of the type including a hatchway extending between an upper terminal station and a lower terminal station with at least one intermediate station and with a car guided in said hatchway and motor propelled for upward and downward movement therein, the control system comprising: first call-send signalling means at one intermediate station for signalling a call signifying a demand for the car to come to said one station to be entered and to proceed thenceforth to a first destination therebelow, second call-send signalling means at said one intermediate station for signalling a call signifying a demand for the car to come to said one station to be entered and to proceed thenceforth to a second destination thereabove, first means responsive to said first call-send signalling means for establishing a first holding circuit for controlling propulsion of said car to said one intermediate station, second means responsive to said first call-send signalling means for establishing a second holding circuit corresponding to said first destination, means responsive to arrival of said car at said one intermediate station under propulsion control of said first means responsive to said first call-send signalling means for terminating the propulsion control holding circuit to stop the car at said one intermediate station and for establishing through said second holding circuit a call holding circiut for said first destination; third means responsive to said second call-send signalling means for establishing a third holding circuit for controlling propulsion of said car to said one intermediate station, fourth means responsive to said second call-send signalling means for establishing a fourth holding circuit corresponding to said second destination, means responsive to arrival of said car at said one intermediate station under propulsion control of said third means responsive to said second call-send signalling means for terminating the propulsion control holding circuit to stop the car at said one intermediate station and for establishing through said fourth holding circuit a call holding circuit for said second destination; and means operative when holding circuits are maintained in said first, second, third, and fourth responsive means for yielding priority of propulsion control and destination call holding circuit establishment to said first and second responsive means or said third and fourth responsive means accordingly as said car is above or below said one intermediate station, and for returning said car to said one intermediate station for delaying establishment of the call holding circuit for the destination in the same direction from said one intermediate station as the initial position of the car.

14. A control system for a vertical lift apparatus of the type including a hatchway extending between an upper terminal station and a lower terminal station with at least one intermediate station and with a car guided in said hatchway and motor propelled for upward and downward movement therein, the control system comprising: first call-send signalling means at one of said stations for signalling a call signifying a demand for the car to come to said one station to be entered and to proceed thenceforth to a first destination in a predetermined direction from said one station, second call-send signalling means at said one station for signalling a call signifying a demand for the car to come to said one station to be entered and to proceed thenceforth to a second destination in said predetermined direction from said one station, means responsive to said first and second call-send signalling means for establishing a holding circuit for controlling propulsion of said car to said one station, means operative on arrival of said car at said one station under control of said last-recited means for terminating the holding circuit thereof, means responsive to said first call-send signalling means for holding a circuit for said first destination, means responsive to said second call-send signalling means for holding a circuit for said second destination, means operative upon arrival of said car at said one station establishing at least one circuit for controlling propulsion of said car in said predetermined direction and for permitting successive stops of said car at said destinations in the order in which they are reached as the car proceeds in said predetermined direction from said one station.

15. A control system for a vertical lift apparatus of the type including a hatchway extending between an upper terminal station and a lower terminal station with at least one intermediate station and with a car guided in said hatchway and motor propelled for upward and downward movement therein, the control system comprising: a first pair of call holding relays for one intermediate station, one relay being provided for holding calls to bring the car downward to said one intermediate station and the other being provided for bringing the car upward to said one intermediate station, a second pair of call holding relays for said one intermediate station, one relay of the second pair being provided for holding calls to bring the car downward to said one intermediate station and the other being provided for bringing the car upward to said one intermediate station, means coupled to the first pair of relays for actuating the relay thereof corresponding to the car position for bringing the car to said one intermediate station for an upward trip therefrom, means coupled to the second pair of relays for actuating the relay thereof corresponding to the car position for bringing the car to said one intermediate station for a downward trip therefrom, means for causing said car to be propelled continuously past said one intermediate station, and means operable with propulsion of the car past the intermediate station in response to said last-named means for accomplishing a transfer through each actuated relay of each of said relay pairs to actuate the other relay of the pair.

16. A control system for a vertical lift apparatus of the type including a hatchway extending between an upper terminal station and a lower terminal station with at least one intermediate station and with a car guided in said hatchway and motor propelled for upward and downward movement therein, the control system comprising: first and second relays for one intermediate station for receiving and holding calls for the car to come to said one intermediate station to be available for ascent therefrom, third and fourth relays for said one intermediate station for receiving and holding calls for the car to come to said one intermediate station to be available for descent therefrom, up call signalling means at said one intermediate station for signalling a call to bring the car to said station to be available for ascent, means coupled to said up call signalling means and to said first and second relays for selective operation of said first relay or said second relay accordingly as the car is above or below said one intermediate station at the time of a signal through said up call signalling means, down call signalling means at said one intermediate station for signalling a call to bring the car to said station to be available for descent therefrom, means coupled to said down call signalling means and to said third and fourth relays for selective operation of said third relay or said fourth relay in response to actuation of said down call signalling means accordingly as the car is above or below said one intermediate station at the time of actuation of said down call signalling means, means coupled to each of said four relays for bringing the car to said one intermediate station and stopping it there in the absence of another call of the car to another station, said second relay being connected to stop said car in upward transit en route to answer a higher call to accord a passenger at said intermediate station timely access to the car for most efficient operation, said third relay being connected to stop the car in downward transit en route to answer a lower call to accord a passenger at said one intermediate station timely access to the car, means for preventing said first relay from stopping said car at said one intermediate station when it is en route to answer a call to a lower station, means operable in response to said first relay when energized for energizing said second relay through said first relay and ending the holding circuit of said first relay during the downward travel of the car to answer the lower station call, means for preventing said fourth relay from stopping said car at said one intermediate station when it is en route to answer a call to a higher station, and means operable in response to said fourth relay when energized for energizing said third relay through said fourth relay and ending the holding circuit of said fourth relay during upward travel of the car to answer the higher station call.

17. A control system for a vertical lift control apparatus as defined in claim 16, further including a first express relay means for compelling said car to travel non-stop upward past one intermediate station to a station thereabove, said first express relay means including means for preventing said second relay from stopping said car at said one intermediate station and for operating through said second relay when energized to energize said first relay and establish a holding circuit therein and terminate the holding circuit in said second relay, second express relay means for compelling said car when above said one intermediate station to travel non-stop downward past said one intermediate station to a station therebelow, said second express relay means including means for preventing said third relay from stopping said car at said one intermediate station and for operating through said third relay when energized to energize said fourth relay and establish a holding circuit therein and terminate the holding circuit in said third relay.

18. A control system for a vertical lift control apparatus as defined in claim 16, further including means for directing said car to said one intermediate station as the ultimate destination, and means responsive thereto for selective operation of said second or third relay accordingly as said car is below or above said one intermediate station at the time of actuation of said directing means.

19. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to a call signalled through said first-named means for establishing and holding a first circuit condition to cause the car to be propelled to said one station and for establishing and holding a second circuit condition corresponding to said designated station, means responsive to arrival of said car at said one station for terminating said first circuit condition to stop the progress of the car, means actuated upon the cessation of said first circuit condition for establishing through said second circuit condition holding means a third circuit holding condition for causing the car to be propelled to said designated station and for terminating said second circuit condition, and means operative upon arrival of said car at said designated station for terminating said third circuit condition.

20. A control system for a vertical lift apparatus as defined in claim 19, wherein said one station is an intermediate station, said system further including means for signalling a call requiring said car to pass by said one station non-stop, means responsive thereto for holding a circuit condition for propulsion of said car past said one intermediate station, and means operative upon concurrent actuation of said last-defined means and said means holding said first circuit condition for replacing said first circuit condition with a further circuit condition for propulsion of said car to said one intermediate station from the opposite direction, upon conclusion of which said third circuit condition is established for said designated station.

21. A control system for a vertical lift apparatus as defined in claim 20, wherein said means for signalling a call requiring said car to pass by said one station comprises an express call signalling switch for a station farther from the car position than said one intermediate station, and said means responsive thereto includes means for propelling said car past said one intermediate station irrespective of the direction of said designated station.

22. A control system for a vertical lift apparatus as defined in claim 20, wherein said means for signalling a call requiring said car to pass by said one station comprises a call signalling switch for a station farther from the car position and from said designated station than the distance from said one intermediate station to said station of said call signalling switch.

23. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to said signalling means for establishing and holding a first circuit condition to cause the car to be propelled to said one station and for establishing and holding a further circuit condition for thereafter causing the car to be propelled to the designated station.

24. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said stations for signalling a call signifying a demand for the car to come to said one station to be entered and to proceed thenceforth to a designated station, means responsive to said signalling means for instituting propulsion of said car to said one station and stopping said car thereat, and means responsive to said signalling means and to the arrival of said car at said one station for instituting propulsion of said car from said one station toward said designated station after a predetermined time at said one station and stopping said car at said designated station.

25. A control system as defined in claim 24, further including means for signalling a call or calls signifying demand for the car to proceed to said one station and to proceed thence immediately in a direction opposite to the direction of said designated station, and means responsive to said last named means for instituting propulsion of said car to said one station and thence in said opposite direction, said last responsive means including means for postponing a stop at said one station and a trip to said designated station until after the first stop thereat and the travel in the opposite direction therefrom.

26. A control system for a vertical lift apparatus of the type including a hatchway extending between an upper terminal station and a lower terminal station with at least one intermediate station and with a car guided in said hatchway and motor propelled for upward and downward movement therein, the control system comprising: means at one of said intermediate stations signalling a call for the car to be employed for an upward trip, means at said one station for signalling a call for the car to be employed for a downward trip, first and second means respectively responsive to said signalling means for holding respective propulsion control circuits therefor, and means including a holding relay for superseding at least one of said propulsion control circuits and causing said car to be propelled past said one intermediate station.

27. A control system for a vertical lift apparatus of the type including a hatchway extending between an upper terminal station and a lower terminal station with at least one intermediate station and with a car guided in said hatchway and motor propelled for upward and downward movement therein, the control system comprising: switch means at a first station for signalling the car to be made available thereat and to make a trip to a predetermined station of destination, a first relay for holding calls to said first station, a second relay for holding calls to said station of destination, a third relay, means responsive to momentary actuation of said switch means at said first station when said car is elsewhere in said hatchway for establishing a holding circuit in said first relay and a holding circuit in said third relay, means responsive to said holding circuit in said first relay for propulsion of said car to said first station, means responsive to arrival of said car at said first station for energizing said second relay momentarily through said third relay and establishing a holding circuit in said second relay, and means responsive to arrival of said car at said first station for opening the holding circuits in said first and third relays.

28. A control system for a vertical lift apparatus of the type including a hatchway extending between an upper terminal station and a lower terminal station with at least one intermediate station and with a car guided in said hatchway and motor propelled for upward and downward movement therein, the control system comprising: switch means at a first station for signalling the car to be made available thereat and to make a trip to a predetermined station of destination, a first relay for holding calls to said first station, a second relay for holding calls to said station of destination, a third relay, means responsive to momentary actuation of said switch means at said first station when said car is elsewhere in said hatchway for establishing a holding circuit in said first relay and a holding circuit in said third relay, means responsive to said holding circuit in said first relay for propulsion of said car toward said first station, means responsive to arrival of said car at said first station for establishing a circuit through said first and third relays for momentarily energizing said second relay and establishing a holding circuit therein, and means responsive to arrival of said car at said first station for thereafter opening the holding circuits in said first and said third relay.

29. A control system for a vertical lift apparatus of the type including a hatchway extending between an upper terminal station and a lower terminal station with at least one intermediate station and with a car guided in said hatchway and motor propelled for upward and downward movement therein, the control system comprising: switch means at a first station for signalling the car to be made available thereat and to make a trip therefrom to a predetermined station of destination, a first relay for holding calls to said first station, a second relay for holding calls for trips to said station of destination in the direction from said first station thereto, a third relay, means responsive to momentary actuation of said switch means at said first station for establishing a holding circuit in said first relay and for establishing a holding circuit in said third relay, means responsive to said holding circuit in said first relay for propulsion of said car to said first station, means responsive to arrival of said car at said first station for energizing said second relay through said third relay and establishing a holding circuit in said second relay, means responsive to arrival of said car at said first station for opening the holding circuits in said first and third relays and stopping the car at said first station, means for blocking propulsion of said car from said first station for a predetermined time after the stop thereat, and means responsive to the holding circuit in said second relay for propulsion of said car to said station of destination after the expiration of said predetermined time.

LE ROY H. KIESLING.

REFERENCES CITED

The following references are of record in the file of this patent:

UNITED STATES PATENTS

| Number | Name | Date |
|---|---|---|
| 1,978,670 | Gale | Oct. 30, 1934 |
| 2,452,342 | Watson et al. | Oct. 26, 1948 |